United States Patent
Oesterling

(10) Patent No.: US 7,373,152 B2
(45) Date of Patent: May 13, 2008

(54) RADIO SIGNAL STRENGTH MAPPING THROUGH A TELEMATICS SYSTEM

(75) Inventor: Christopher L. Oesterling, Troy, MI (US)

(73) Assignee: General Motors Corporation, Detroit, MI (US)

( * ) Notice: Subject to any disclaimer, the term of this patent is extended or adjusted under 35 U.S.C. 154(b) by 591 days.

(21) Appl. No.: 10/293,772

(22) Filed: Nov. 13, 2002

(65) Prior Publication Data

US 2004/0203436 A1  Oct. 14, 2004

(51) Int. Cl.
*H04Q 7/20* (2006.01)

(52) U.S. Cl. .................. 455/456.1; 455/404.2; 455/421; 455/9; 455/67.11; 701/213; 701/214

(58) Field of Classification Search .......... 455/456.1, 455/404.2, 421, 9, 65, 67.11, 67.7, 226; 701/213, 701/214, 216
See application file for complete search history.

(56) References Cited

U.S. PATENT DOCUMENTS

| | | | | |
|---|---|---|---|---|
| 5,155,689 A | * | 10/1992 | Wortham | 455/456.3 |
| 5,175,867 A | * | 12/1992 | Wejke et al. | 455/439 |
| 5,280,630 A | * | 1/1994 | Wang | 455/452.2 |
| 5,428,816 A | * | 6/1995 | Barnett et al. | 455/437 |
| 5,491,837 A | * | 2/1996 | Haartsen | 455/62 |
| 5,701,585 A | * | 12/1997 | Kallin et al. | 455/437 |
| 6,526,279 B1 | * | 2/2003 | Dent | 455/437 |
| 6,862,447 B1 | * | 3/2005 | Solondz | 455/423 |
| 6,871,067 B2 | * | 3/2005 | Clark et al. | 455/428 |
| 6,871,139 B2 | * | 3/2005 | Liu et al. | 701/201 |
| 6,952,181 B2 | * | 10/2005 | Karr et al. | 342/457 |
| 6,993,316 B2 | * | 1/2006 | Marko et al. | 455/343.1 |
| 2002/0049058 A1 | * | 4/2002 | Tee | 455/437 |
| 2002/0115436 A1 | * | 8/2002 | Howell et al. | 455/426 |
| 2004/0075606 A1 | * | 4/2004 | Laiho et al. | 342/357.1 |
| 2004/0198217 A1 | * | 10/2004 | Lee et al. | 455/3.01 |
| 2004/0203728 A1 | | 10/2004 | Schwinke et al. | |
| 2005/0164695 A1 | | 7/2005 | Kamdar et al. | |
| 2005/0208936 A1 | | 9/2005 | Sumcad et al. | |
| 2006/0079203 A1 | | 4/2006 | Nicolini | |
| 2006/0079219 A1 | | 4/2006 | Nicolini | |

FOREIGN PATENT DOCUMENTS

| | | |
|---|---|---|
| WO | WO 99/45732 | 9/1999 |
| WO | WO 00/01172 | 1/2000 |
| WO | WO 00/04730 | 1/2000 |

OTHER PUBLICATIONS

U.S. Appl. No. 11/273,659, filed Nov. 14, 2005, Krause et al.
U.S. Appl. No. 11/396,875, filed Apr. 3, 2006, Zoeckler et al.

* cited by examiner

*Primary Examiner*—Matthew Anderson
*Assistant Examiner*—Minh Dao

(57) ABSTRACT

The invention provides a method of and system for determining a radio-frequency signal strength at a mobile vehicle. A signal strength measurement request is received from a call center for a selected radio frequency, a signal strength of the selected radio frequency is measured at the mobile vehicle, and the measured signal strength is sent to the call center.

29 Claims, 2 Drawing Sheets

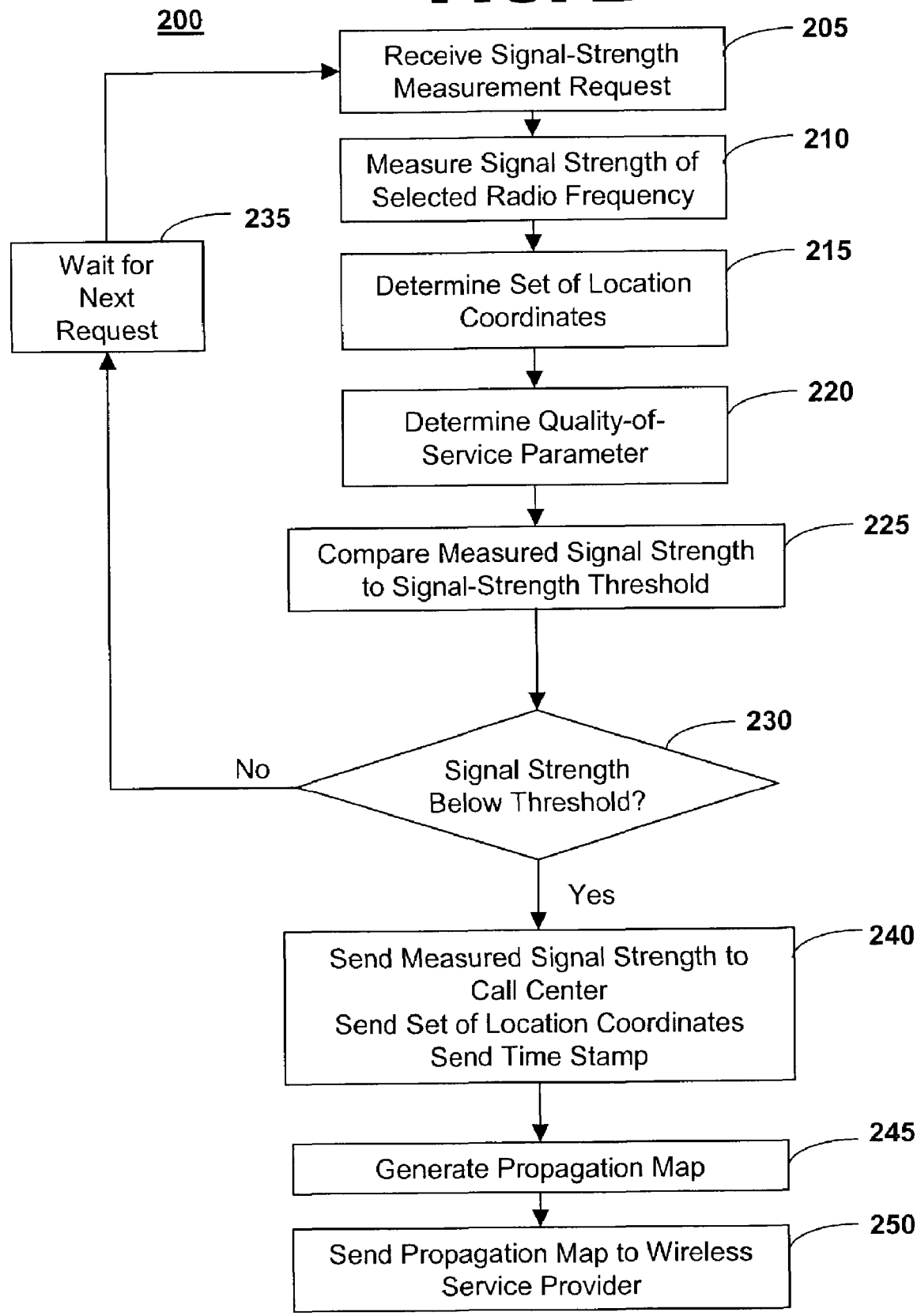

RADIO SIGNAL STRENGTH MAPPING THROUGH A TELEMATICS SYSTEM

FIELD OF THE INVENTION

This invention relates generally to radio-frequency signal strength determination. More specifically, the invention relates to a method that uses radio signal measurements, broadcasted time information, and global positioning data to map radio-frequency signal strengths.

BACKGROUND OF THE INVENTION

Over 40% of radio listening in the United States takes place in mobile vehicles, the most popular location for receiving radio broadcasts. Emerging standards and advances in digital technology are leading to increased radio services for vehicles from sources including satellite radio, terrestrial digital radio, cellular phone services and other wireless communication systems, added to the services of long-standing and well-established amplitude modulation (AM), frequency modulation (FM) radio technologies and television broadcasts.

New wireless Internet, multimedia and telematics applications are converging in new automobile design, with the expectation that nearly 50% of new cars by year 2006 will have telematics capabilities, many with global positioning systems.

Of particular importance to radio broadcasters and wireless communication services is their ability to provide good signal reception to vehicles and fixed locations within their broadcast area. Unfortunately, these service providers are often limited in their ability to test actual radio reception, which typically requires transporting portable test equipment around the local area of a broadcast station to take signal-strength measurements.

In recent years, companies providing telematics and other communication services to mobile vehicles have been focused on providing comprehensive radio and wireless communication coverage. Radio reception has been poor in some geographical areas, but broadcasters and other communication service providers have had no efficient or cost-effective way to detect areas of low or poor radio reception. What is needed is a system and method that can use the current infrastructure of vehicle communications equipment to detect problem areas of broadcast and two-way wireless communication systems. With this information, service providers could improve radio broadcast and wireless communication coverage by planning transmitter positions, output power and other system parameters based on many thousands of signal strength measurements taken on an ongoing basis, rather than on periodic measurements taken with portable test equipment.

It is an object of this invention, therefore, to overcome the deficiencies and limitations described above, as well as to provide a more comprehensive, accurate and efficient method and system for determining a signal strength of a select radio frequency received at a mobile vehicle, using currently available radio and wireless communication devices.

SUMMARY OF THE INVENTION

One aspect of the invention provides a method and system for determining a radio-frequency signal strength at a mobile vehicle. The mobile vehicle receives a signal strength measurement request from a call center for a selected radio frequency. A signal strength of the selected radio frequency is measured at the mobile vehicle, and the measured signal strength is sent to the call center.

A set of location coordinates of the mobile vehicle may be determined and sent from the mobile vehicle to the call center. Additionally, a time stamp may be transmitted. A radio propagation map may be generated from the measured signal strengths, and the radio propagation map may be sent to a wireless service provider. A quality-of-service parameter may be determined for the selected radio frequency. The measured signal strength may be compared to a signal strength threshold and then sent to the call center. Another aspect of the invention includes a computer usable medium with a program to determine a radio-frequency signal strength at a mobile vehicle.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

The present invention is illustrated by the accompanying drawings of various embodiments and the detailed description given below. The drawings should not be taken to limit the invention to the specific embodiments, but are for explanation and understanding. The foregoing aspects and other attendant advantages of the present invention will become more readily appreciated by the detailed description taken in conjunction with the accompanying drawings, wherein:

FIG. 2 is a flow diagram of one embodiment of a method for determining a radio-frequency signal strength at a mobile vehicle, in accordance with the current invention.

DETAILED DESCRIPTION OF THE PRESENTLY PREFERRED EMBODIMENTS

Figure 1:
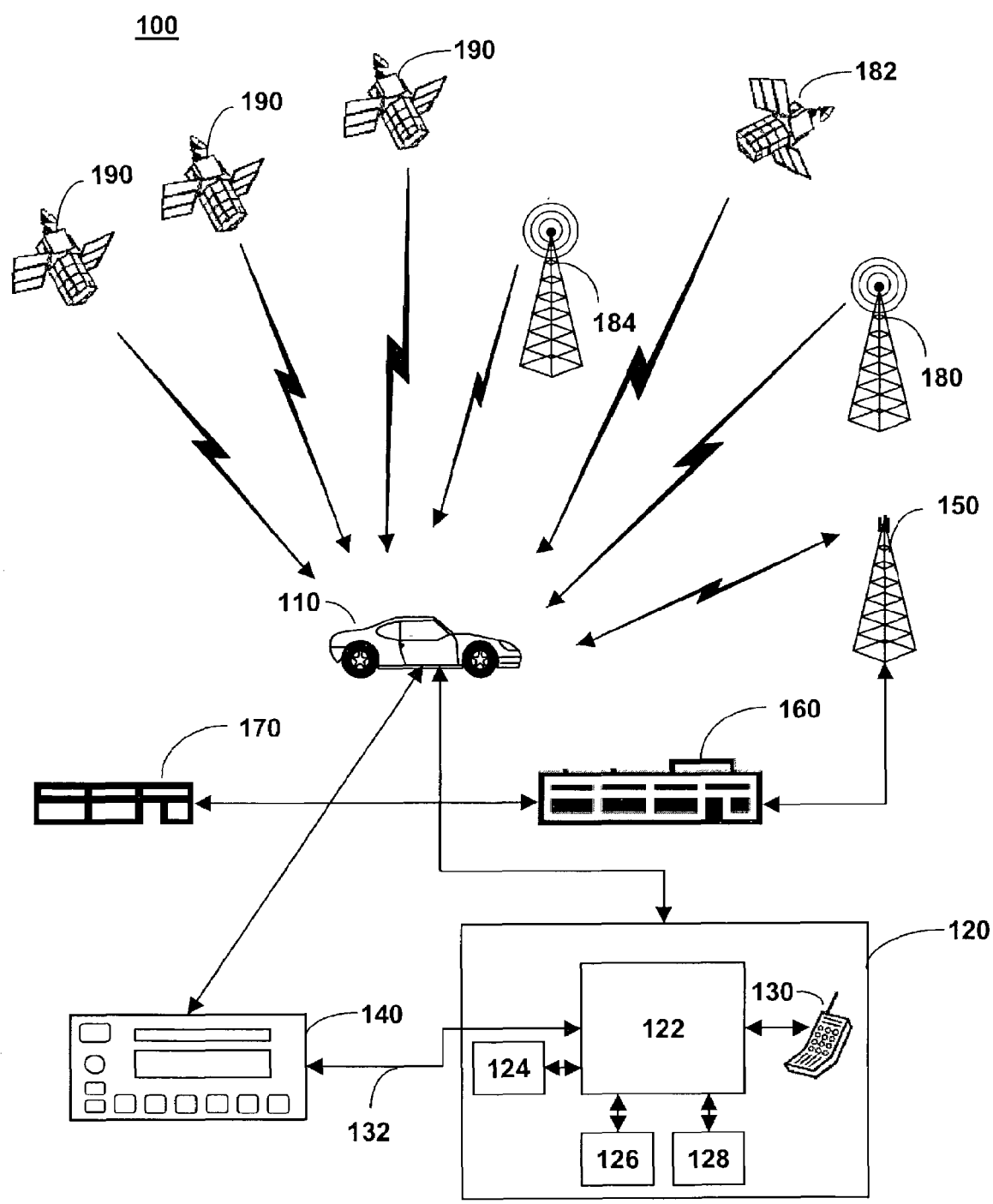
FIG. 1 is an illustration of one embodiment of a system for determining a radio-frequency signal strength at a mobile vehicle, in accordance with the current invention.

Many vehicles equipped with AM, FM, satellite and digital radios, and embedded cellular phones have the capability of determining signal strengths of radio stations and mobile communication systems in the area where the vehicle is located. In the present invention, a telematics unit with a global positioning system (GPS) and radio determines and reports microvolt measurements of radio strength and the location of the vehicle to a telematics service call center. The telematics unit, a call center, or a propagation map facility aggregates the measured signal strengths of broadcast and communication signals at a specified frequency or channel, and generates a signal strength or radio propagation map containing the measured signal strengths and the geographical locations where the signals were measured.

Call centers and radio service providers that use the present invention can more effectively monitor signal coverage and increase services in low coverage areas. The data from signal strength readings of a vehicle are aggregated with data from thousands of other vehicles to create radio propagation maps. These maps help telematics or radio service providers improve radio coverage by planning transmitter positions, output power and other system parameters.

In addition, the wireless communication carrier can use propagation maps and the propagation data to evaluate transmitter and receiver capabilities, such as estimating communications range performance, determining allowable path loss, calculating antenna factors, or determining which system parameters need to be improved to meet a specific communications range goal.

FIG. 1 illustrates one embodiment of a system for determining a radio-frequency signal strength at a mobile vehicle, in accordance with the present invention at 100. The invention leverages the infrastructures of wireless communication and broadcast radio systems, as well as telematics and radio receiver equipment located in a vehicle.

Radio strength determination system 100, in an exemplary embodiment of the present invention, includes a mobile vehicle 110, a telematics unit 120, a radio receiver 140, one or more wireless communications systems 150, one or more call centers 160, at least one radio propagation mapping facility 170, one or more radio broadcast systems 180, one or more satellite radio geostationary satellites 182, one or more satellite radio terrestrial repeaters or satellite radio terrestrial transmitters 184 and at least three GPS satellites 190.

Mobile vehicle 110 is a mobile vehicle equipped with suitable hardware and software for transmitting and receiving voice and data communications. Mobile vehicle 110 contains telematics unit 120 that includes a vehicle communications processor. Telematics unit 120 typically includes a digital signal processor (DSP) 122 connected to a wireless analog, digital or dual-mode modem 124, a global positioning system (GPS) unit 126, an in-vehicle memory 128, and a network access device (NAD) or in-vehicle mobile phone 130. In-vehicle mobile phone 130 may be an analog, digital, or dual-mode cellular phone.

GPS unit 126 provides, for example, longitude and latitude coordinates of the vehicle. GPS unit 126 receives signal information from three or more GPS satellites 190 of the approximately 25 U.S. Department of Defense GPS satellites and use triangulation to calculate its location. Essentially, GPS unit 126 compares the time that a signal was transmitted by GPS satellite 190 with the time it was received at the unit. The time difference indicates how far away the GPS satellite is, and with the distance measurements from the satellites, GPS unit 126 determines its position using a position determination algorithm. Generally, the position may be accurate to within 15 meters. In another embodiment, GPS unit 126 may broadcast over a foreign global positioning system, such as, for example, the Russian Global Navigation Satellite System (GLONASS).

DSP 122 uses instructions and data from a computer usable medium that contains various computer programs for controlling programming and operational modes within mobile vehicle 110. For example, a measurement application installed in DSP 122 determines the radio signal strength of radio signals that are received by radio receiver 140.

DSP 122 includes one or more computer applications to process, manage and correct GPS location information from GPS satellites received by GPS unit 126. DSP 122 typically includes a program for determining a location of a mobile vehicle with code to receive a plurality of GPS signals in the mobile vehicle; to extract the GPS correction signal; and to determine a corrected mobile vehicle location based on the GPS signals and the GPS correction signal. The DSP 122 also may include computer code to calculate strengths of signals received by radio receiver 140. The computer code is stored in telematics unit 120 using non-volatile memory or a combination of volatile memory and non-volatile memory, or stored on any computer-usable medium such as magnetic media or compact discs.

Telematics unit 120, which is electronically connected to radio receiver 140, is connected to radio receiver 140 through vehicle communication bus 132. Radio receiver 140 may be any suitable hardware for receiving radio broadcast signals in mobile vehicle 110. Radio receiver 140 sends and receives digital signals to and from telematics unit 120. Radio receiver 140 also receives broadcasted signals containing news, weather, traffic information, music, and educational programming from one or more broadcast channels. Radio receiver 140 of an exemplary embodiment of the present invention converts and outputs the received signals in audio and digital formats. Radio receiver 140 receives an amplitude modulation (AM) radio frequency, a frequency modulation (FM) radio frequency, a satellite radio frequency, a cellular phone radio channel or another type of radio broadcast frequency. Typically radio receiver 140 is a self-contained device, but it can be contained within telematics unit 120 or another device.

Telematics unit 120 of the exemplary embodiment is electronically connected to radio receiver 140 and monitors signals that are received from satellite broadcasts, radio broadcasts and wireless communications systems. Telematics unit 120 receives, monitors and stores data and information from radio receiver 140, such as the measured signal strength and the frequency or channel at which the radio signal strength was measured.

When mobile vehicle 110 is equipped with a radio receiver 140 that receives satellite radio signals, satellite radio geostationary satellite 182 transmits radio signals to in-vehicle radio receiver 140. Satellite radio geostationary satellite 182 broadcast, for example, over a spectrum in the "S" band (2.3 GHz) that has been allocated by the U.S. Federal Communications Commission (FCC) for nation-wide broadcasting of satellite-based Digital Audio Radio Service (DARS). Satellite radio geostationary satellite 182 may transmit radio signals containing data to radio receiver 140 in mobile vehicle 110. Radio receiver 140 as part of a satellite radio system then receives digitized audio, digitized video, or data over each broadcast channel. In current radio systems, transmissions are sent in the S band (approved for use in the U.S.) or the L band (used in Europe and Canada). Alternatively, satellite radio broadcasts may be received from one or more satellite radio terrestrial repeaters or satellite radio terrestrial transmitters 184.

Radio signals are sent from a radio broadcast tower or station of radio broadcast system 180 to radio receiver 140, when the present invention employs radio receiver 140 capable of receiving amplitude modulation (AM) radio frequency, a frequency modulation (FM) radio frequency, a cellular phone radio channel or another type of radio broadcast system.

Telematics unit 120 of the present invention monitors a selected radio frequency received by radio receiver 140 for broadcast signals. When radio signals are detected, telematics unit 120 measures the radio-frequency signal strength at the selected radio frequency or channel.

Telematics unit 120 may then send the measurements of the radio signal strength to call center 160, as well as location coordinates taken from readings by GPS unit 126. Call center 160 is a location where many calls are received and serviced at the same time, or where many calls may be sent at the same time. The call center may be a telematics call center, prescribing communications to and from telematics unit 120 in mobile vehicle 110. The call center is typically a voice call center, providing verbal communications between an advisor in the call center and a subscriber in mobile vehicle 110. Call center 160, which can communicate with mobile vehicle 110 through wireless communications system 150 may aggregate radio propagation data from mobile vehicle 110 specifically, as well as thousands of other vehicles to monitor radio channel performance for problems such as low throughput, high bit error rate or low signal strength. Data related to the signal strength measurements can be mapped and used to diagnose geographical areas of weak signal strength. The call center can relay the propagation information to radio service providers, who then plan transmitter positions and output power, thereby improving radio coverage.

FIG. 2 shows one embodiment of a method for determining a radio-frequency signal strength at a mobile vehicle, in accordance with the present invention at 200. Signal strength determination method 200, which determines a radio frequency signal strength at a mobile vehicle, comprises steps for a mobile vehicle to receive a request from a call center for measuring signal strength and to send a signal strength measurement and GPS coordinate data back to the call center. A propagation map can be generated from aggregated signal strength measurements. The present invention is able to leverage tens-of-thousands of vehicles that act as radio propagation data probes.

Signal strength determination method 200 begins with an in-vehicle telematics unit receiving a request from a call center to measure a radio signal strength of a selected radio frequency received at an in-vehicle radio receiver, as seen at block 205. The radio frequency is, for example, an amplitude modulation (AM) radio frequency, a frequency modulation (FM) radio frequency, a satellite radio frequency, a cellular phone radio channel, or another type of radio broadcast frequency or radio communications channel. When the signals are from a satellite radio system, the radio frequency is broadcast from a geo-stationary satellite or a terrestrial repeater. Alternatively, the radio signals are broadcast from a radio tower, a radio station, a base station, or any suitable radio antenna.

The signal strength measurement request is sent with an over-the-air interface function. In response to the request, the vehicle may scan select frequencies of broadcast AM, FM, satellite, cellular and other radio frequency broadcast and communication systems. The signal strength of the selected radio frequency is measured at the mobile vehicle, as seen at block 210. Measuring the signal strength usually involves sending a signal strength measurement command message through a vehicle communication bus to a radio receiver in the mobile vehicle, and receiving the measured signal strength at an in-vehicle telematics unit using a vehicle bus communication protocol such as the J1850 VPW standard, also known as Class 2; the J1850, PWM standard, also known as SCP; ISO 9141 and ISO9141-2, also known as ISO 9141 CARB; and other OBD-II vehicle network standards. Alternatively, the signal strength measurement may be made by monitoring a satellite radio receiver or cellular phone embedded in the telematics unit without the use of the vehicle bus.

The telematics unit receives GPS signals from a plurality of GPS satellites to calculate the location of the mobile vehicle. A set of location coordinates of the mobile vehicle is determined from those GPS signals, as seen at 215. The digital signal processor (DSP) of the telematics unit records the coordinate information and signal strength information. Related information, such as quality-of-service parameters, may also be generated at the telematics unit. Alternatively, quality of service parameters may be determined at the call center, a propagation mapping facility or other suitable location.

A quality-of-service parameter can be determined for the selected radio frequency or channel, as seen at block 220. The quality-of-service parameter is, for example, a frame error rate, a bit error rate, or a data transmission rate. Quality of Service (QoS) describes the collective measure of the level of radio service a provider delivers to its subscribers. For connection-oriented services, QoS are usually measured in terms of parameters such as throughput, delay, and delay jitter. In wireless radio systems, the wireless carrier may calculate an error probability, transit delay, message priority, transit delay, residual error probability, specified route, source routing, congestion control, and sequence preservation probability. In cellular radio systems, the QoS parameters may be measured by call success rate, service coverage, voice quality and call dropouts.

The measured signal strength is compared to a signal strength threshold, as seen at block 225. A signal strength threshold is, for example, a predetermined number corresponding to a reference signal strength measurement, in microvolts. The threshold is usually preset and stored in the digital signal processor of the telematics unit. The threshold may be updated periodically with a new threshold level sent from the call center to the mobile vehicle. The threshold is updated using an over-the-air-interface function or any other suitable communication protocol between the call center and the mobile vehicle.

The signal strength may or may not be below a threshold, as seen at block 230. In cases where the signal strength is above a set threshold, the telematics sends nothing to the call center and waits for a next signal strength measurement request from the call center, as seen at block 235. When the measured signal strength is below the threshold, the measured signal strength may be sent to the call center based on the signal strength threshold, as seen at block 240. Additionally, a set of GPS location coordinates and a time stamp may be sent from the mobile vehicle to the call center. The time stamp information is used to generate propagation maps that show potentially sensitivities to weather and other meteorological phenomena. The measured signal strength, as well as the set of location coordinates and time stamp is sent with an over-the-air interface function or other wireless communications protocol to the call center. The sent data may be sent without an indication of the identity of the vehicle from which the information was sent.

The call center, in an exemplary embodiment of the present invention, aggregates a number of signal strength measurements and sends that data to radio propagation mapping facility, which may be separate from or integrated as part of the call center. In either case, a radio propagation map is generated from the measured signal strengths, as seen at block 245. The radio propagation map is generated based on a set of location coordinates of the mobile vehicle. A propagation map may be a computer-generated graphical representation of a geographical broadcast coverage area indicating signal strengths with, for example, thousands of dots of varying colors, each representing a signal strength measurements within a geographical area. Other charts such as contour plots and tables of aggregate data from many vehicles also can be generated. The propagation map and the aggregate data are tools to diagnose problems of poor radio coverage in a specific geographical area.

The radio propagation map is sent to a radio or wireless service provider, as seen at block 250. The wireless service provider is an FM station, an AM station, a satellite radio broadcast service, a cell phone service provider, a radio broadcast station, or any other wireless broadcasting or communication services provider such as low power FM networks. The service provider can use the propagation information to determine placement of new transmitters and to set levels of output power that provide the best radio coverage.

In alternative configurations of the present invention, the signal strength may be sent to the call center or other suitable facility when the measured strength is above a predetermined location. In another embodiment, various types of QoS parameters are used in the steps of determining of a quality of service parameter, as seen at block 220. In another embodiment, steps for determining the QoS, as well as for comparing the measured signal strength to a threshold, as seen at blocks 225, 230 and 235, are omitted. While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of determining a radio-frequency signal strength at a mobile vehicle, comprising:
    receiving, at an in-vehicle telematics unit, a signal strength measurement request from a call center for a selected radio broadcast frequency;
    measuring a signal strength of the selected radio broadcast frequency at the mobile vehicle, wherein measuring the signal strength includes sending a signal strength measurement command message through a vehicle communication bus to a radio receiver in the mobile vehicle, and receiving the measured signal strength at the in-vehicle telematics unit; and
    sending the measured signal strength to the call center.

2. The method of claim 1 wherein the signal strength measurement request is received using an over-the-air interface function.

3. The method of claim 1 wherein the radio broadcast frequency is selected from the group consisting of an AM radio frequency, an FM radio frequency, a satellite radio frequency.

4. The method of claim 3 wherein the satellite radio frequency is broadcast from one of a geo-stationary satellite or a terrestrial repeater.

5. The method of claim 1 wherein the measured signal strength is sent using an over-the-air interface function.

6. The method of claim 1 further comprising:
    determining a set of location coordinates of the mobile vehicle; and
    sending the set of location coordinates from the mobile vehicle to the call center.

7. The method of claim 1, further comprising sending a time stamp from the mobile vehicle to the call center.

8. The method of claim 1, further comprising generating a radio propagation map from the measured signal strengths.

9. The method of claim 8 wherein the radio propagation map is generated based on a set of location coordinates of the mobile vehicle.

10. The method of claim 8, further comprising sending the radio propagation map to a wireless service provider.

11. The method of claim 10 wherein the wireless service provider is selected from the group consisting of an FM station, an AM station, a satellite radio broadcast service, and a radio broadcast station.

12. The method of claim 1, further comprising determining a quality-of-service parameter for the selected radio broadcast frequency.

13. The method of claim 12 wherein the quality-of-service parameter is selected from the group consisting of a frame error rate, a bit error rate, and a data transmission rate.

14. The method of claim 1, further comprising:
    comparing the measured signal strength to a signal strength threshold; and
    sending the measured signal strength to the call center based on the signal strength threshold.

15. A computer usable medium containing a program to determine a radio-frequency signal strength at a mobile vehicle, comprising:
    computer program code to receive, at an in-vehicle telematics unit, a signal strength measurement request from a call center for a selected radio broadcast frequency;
    computer program code to measure a signal strength of the selected radio broadcast frequency at the mobile vehicle, wherein the computer program code to measure the signal strength includes a computer program code to send a signal strength measurement command message through a vehicle communication bus to a radio receiver in the mobile vehicle, and computer program code to receive the measured signal strength at an in-vehicle telematics unit; and
    computer program code to send the measured signal strength to the call center.

16. The computer usable medium of claim 15, further comprising:
    computer program code to determine a set of location coordinates of the mobile vehicle; and
    computer program code to send the set of location coordinates from the mobile vehicle to the call center.

17. The computer usable medium of claim 15, further comprising computer program code to send a time stamp from the mobile vehicle to the call center.

18. The computer usable medium of claim 15, further comprising computer program code to generate a radio propagation map from the measured signal strengths.

19. The computer usable medium of claim 18, further comprising computer program code to send the radio propagation map to a wireless service provider.

20. The computer usable medium of claim 15, further comprising computer program code to determine a quality-of-service parameter for the selected radio frequency.

21. The computer usable medium of claim 15, further comprising:
    computer program code to compare the measured signal strength to a signal strength threshold; and
    computer program code to send the measured signal strength to the call center based on the signal strength threshold.

22. A system for determining a radio-frequency signal strength at a mobile vehicle, comprising:
    means for receiving, at an in-vehicle telematics unit, a signal strength measurement request from a call center for a selected radio broadcast frequency;
    means for measuring a signal strength of the selected radio broadcast frequency at the mobile vehicle, the means for measuring the signal strength including means for sending a signal strength measurement command message through a vehicle communication bus to a radio receiver in the mobile vehicle, and means for receiving the measured signal strength at an in-vehicle telematics unit; and means for sending the measured signal strength to the call center.

23. The system of claim 22, further comprising:
means for determining a set of location coordinates of the mobile vehicle; and
means for sending the set of location coordinates from the mobile vehicle to the call center.

24. The system of claim 22, further comprising means for sending a time stamp from the mobile vehicle to the call center.

25. The system of claim 22, further comprising means for generating a radio propagation map from the measured signal strengths.

26. The system of claim 25, further comprising means for sending the radio propagation map to a wireless service provider.

27. The system of claim 22 further comprising means for determining a quality-of-service parameter for the selected radio frequency.

28. The system of claim 22, further comprising:
means for comparing the measured signal strength to a signal strength threshold; and
means for sending the measured signal strength to the call center based on the signal strength threshold.

29. A method of determining a radio-frequency signal strength at a mobile vehicle, comprising:

receiving, at an in-vehicle telematics unit, a signal strength measurement request from a call center for a radio broadcast frequency selected from an AM radio frequency, an FM radio frequency, and a satellite radio frequency;

measuring a signal strength of the selected radio broadcast frequency at the mobile vehicle, wherein measuring the signal strength comprises sending a signal strength measurement command message through a vehicle communication bus to a radio receiver in the mobile vehicle, and receiving the measured signal strength at an in-vehicle telematics unit;

determining a set of location coordinates of the mobile vehicle;

sending the measured signal strength and the set of location coordinates to the call center; and generating a radio propagation map from the measured signal strengths and the set of location coordinates.

* * * * *